(12) United States Patent
Jeong

(10) Patent No.: US 8,646,354 B2
(45) Date of Patent: Feb. 11, 2014

(54) GEAR SHIFT UNIT FOR AUTOMATED MANUAL TRANSMISSION

(75) Inventor: Wooyeol Jeong, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 833 days.

(21) Appl. No.: 12/826,145

(22) Filed: Jun. 29, 2010

(65) Prior Publication Data

US 2011/0107862 A1    May 12, 2011

(30) Foreign Application Priority Data

Nov. 12, 2009  (KR) .................. 10-2009-0109076

(51) Int. Cl.
*F16H 61/32* (2006.01)
*F16H 59/10* (2006.01)
*F16H 59/44* (2006.01)
*F16H 61/24* (2006.01)
*F16H 63/20* (2006.01)
*F16H 27/08* (2006.01)
*F16H 27/04* (2006.01)

(52) U.S. Cl.
USPC ............... 74/473.12; 74/473.1; 74/473.18; 74/473.36; 74/435

(58) Field of Classification Search
USPC .............. 74/473.1, 473.12, 473.18, 325, 335, 74/435
See application file for complete search history.

(56) References Cited

U.S. PATENT DOCUMENTS

| | | | | |
|---|---|---|---|---|
| 2,649,813 A | * | 8/1953 | Barth et al. | 74/335 |
| 3,187,600 A | * | 6/1965 | Seybold | 74/393 |
| 4,117,739 A | * | 10/1978 | Meier et al. | 74/404 |
| 5,689,997 A | * | 11/1997 | Schaller | 74/335 |
| 6,062,097 A | * | 5/2000 | Imao et al. | 74/473.12 |
| 6,990,872 B2 | * | 1/2006 | Chen | 74/335 |
| 7,398,706 B2 | * | 7/2008 | Pollak et al. | 74/473.36 |
| 7,418,884 B2 | * | 9/2008 | Schepperle | 74/335 |
| 7,779,713 B2 | * | 8/2010 | Ehrlich et al. | 74/335 |
| 2006/0272436 A1 | * | 12/2006 | Lein et al. | 74/335 |
| 2008/0060462 A1 | * | 3/2008 | Jayaram et al. | 74/335 |

FOREIGN PATENT DOCUMENTS

| | | |
|---|---|---|
| JP | 9-112688 A | 5/1997 |
| JP | 2006-10009 A | 1/2006 |
| JP | 2008-89068 A | 4/2008 |
| JP | 2008-138775 A | 6/2008 |
| KR | 10-0558299 B1 | 3/2006 |
| KR | 10-0705134 B1 | 4/2007 |
| KR | 10-0867461 B1 | 11/2008 |

* cited by examiner

*Primary Examiner* — Troy Chambers
*Assistant Examiner* — Emily Cheng
(74) *Attorney, Agent, or Firm* — Morgan, Lewis & Bockius LLP

(57) ABSTRACT

A gear shift unit for an automated manual transmission, may include a shift block that is restricted in the rotational direction and slidably movable along a control shaft, and has a shift finger in order to implement a selecting operation with straight motion thereof and a shifting operation with rotation motion thereof, a driving actuator, a shifting unit selectively engaged with the driving actuator to rotate the control shaft by power of the driving actuator, wherein the shifting unit changes rotational direction of the control shaft in accordance with rotational angles of the driving actuator, and a selecting unit selectively engaged with the driving actuator to slide the shift block along the control shaft by power of the driving actuator while the shifting unit is not driven by the power of the driving actuator.

7 Claims, 9 Drawing Sheets

GEAR SHIFT UNIT FOR AUTOMATED MANUAL TRANSMISSION

CROSS-REFERENCE TO RELATED APPLICATIONS

The present application claims priority to Korean Patent Application No. Number 10-2009-0109076 filed Nov. 12, 2009, the entire contents of which are incorporated herein for all purposes by this reference.

BACKGROUND OF THE INVENTION

1. Field of the Invention

The present invention relates to a gear shift unit for an automated manual transmission, in more detail, a technology making it possible to implement shifting and selecting operations with one motor.

2. Description of Related Art

AMTs (Automated Manual Transmission) have mechanism with the same configuration as manual transmissions of the related art, but improve convenience of drivers by using not the force of drivers, but force of an actuator, for shifting.

Since AMTs have the advantage of providing drivers with convenience making them as if they drives vehicle equipped with an automatic transmission, without loss of power due to the torque converter of automatic transmission or cost for developing a new transmission, because they use existing manual transmissions without replacing the transmissions. Therefore, it is the main technical concern how to implement shifting and selecting operations.

It is preferable to implement selecting and shifting operations with a simple configuration using fewer parts even in the automated manual transmission and it is required to have appropriate operability and response.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a gear shift unit for an automated manual transmission having appropriate operability and response as well as implementing selecting and shifting operations required for shift with a simple configuration using fewer parts in comparison with the related art.

An aspect of the present invention provides a shift block that is restricted in the rotational direction and slidably movable along a control shaft, and has a shift finger in order to implement a selecting operation with straight motion thereof and a shifting operation with rotation motion thereof, a driving actuator, a shifting unit selectively engaged with the driving actuator to rotate the control shaft by power of the driving actuator, wherein the shifting unit changes rotational direction of the control shaft in accordance with rotational angles of the driving actuator, and a selecting unit selectively engaged with the driving actuator to slide the shift block along the control shaft by power of the driving actuator while the shifting unit is not driven by the power of the driving actuator.

The shifting unit may include a first shift gear fixed to a rotary shaft of the driving actuator and having a predetermined tooth portion, a second shift gear fixed to the rotary shaft of the driving actuator and having two predetermined tooth portions not corresponding to the predetermined tooth portion of the first shift gear, a second driven gear fixed to the control shaft and selectively engaging with one of the two predetermined tooth portions of the second shift gear, an idler gear selectively engaging with the predetermined tooth portion of the first shift gear, and a first driven gear fixed to the control shaft to engage with the idler gear.

The selecting unit may include a select driving gear fixed to the rotary shaft of the driving actuator and having a predetermined tooth portion that does not correspond to the two predetermined tooth portions of the second shaft gear and the predetermined tooth portion of the first shift gear, a select driven gear selectively engaging with the predetermined tooth portion of the select driving gear, a leading guide coaxially fixed to the select driven gear in parallel with the rotary shaft of the driving gear, and a shifting member movably coupled to the leading guide and selectively sliding the shift block along the control shaft in a reciprocating manner, wherein the shift block is slidably coupled to the control shaft.

The leading guide may include a ball screw and the shifting member includes a ball nut.

The predetermined tooth portion of the first shift gear may be formed between the two predetermined tooth portions of the second shift gear, wherein the two predetermined tooth portions of the second shift gear are symmetrically formed with respect to the predetermined tooth portion of the first shift gear.

The total length of the two predetermined tooth portions of the second shift gear may be the same as the length of the predetermined tooth portion of first shift gear.

The predetermined tooth portion of the first shift gear may include a first neutral portion in which a tooth is not formed.

A second neutral portion in which a tooth is not formed, may be formed between the two predetermined tooth portions of the second shift gear and the predetermined tooth portion of the select driving gear.

The shifting member may have a locking protrusion protruding toward the shift block to allow rotation of the shift block on the control shaft, but prevent reciprocation of the shift block along the control shaft, and the shift block may have a locking groove to receive the locking protrusion therein.

The present invention provides a gear shift unit for an automated manual transmission that can implement both selecting and shifting operations for shift, using less number of parts and a simpler configuration than the related art, and also has appropriate operability and response, because it uses only one driving motor.

Further, it is possible to reduce weight the transmission and easily mount the transmission in a vehicle by using only one motor.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
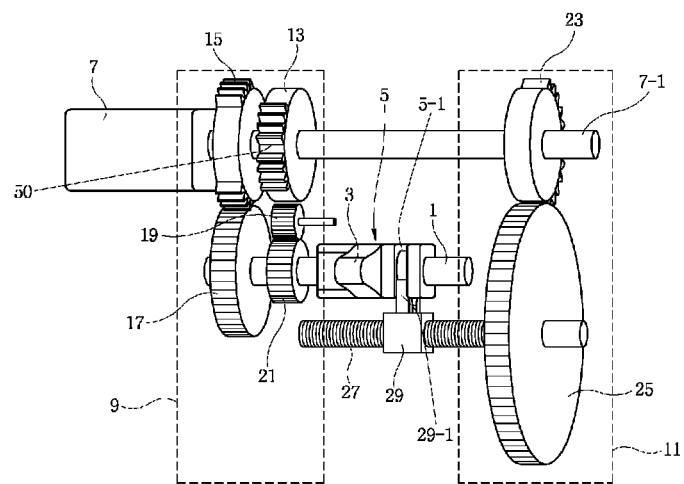
FIG. 1 is a view illustrating an exemplary gear shift for an automated manual transmission according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
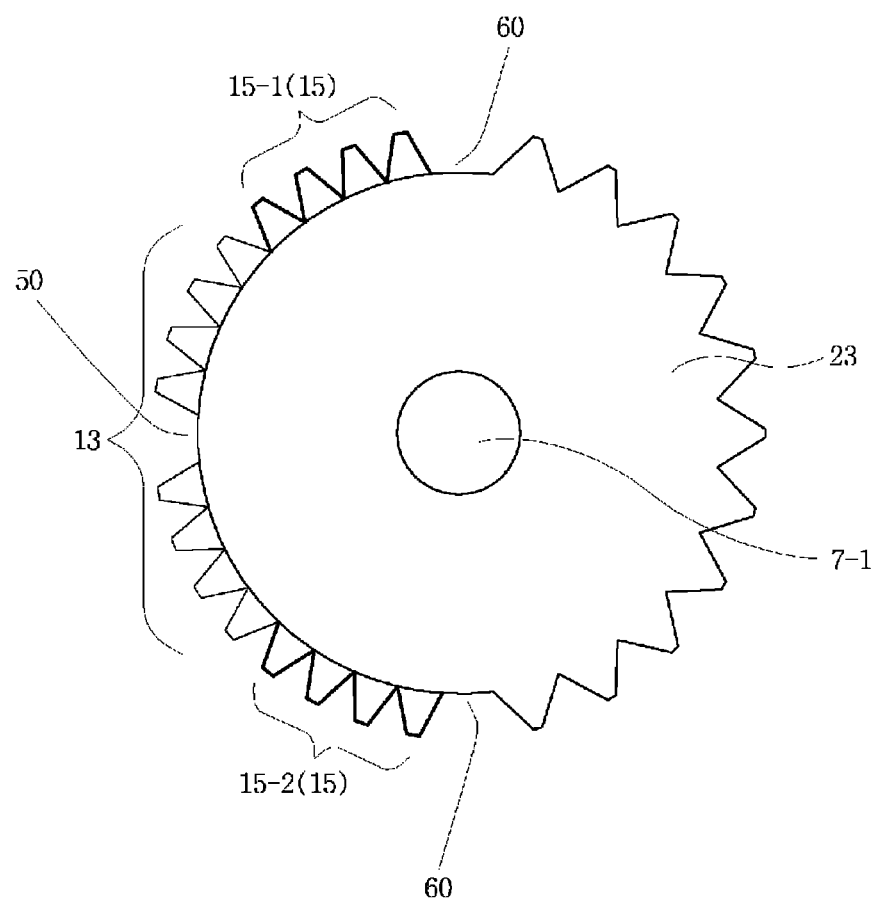
FIG. 2 is a view seen from the right when the select-driving gear, a first shift gear, and second shift gear of FIG. 1 overlap.
Figure 3:
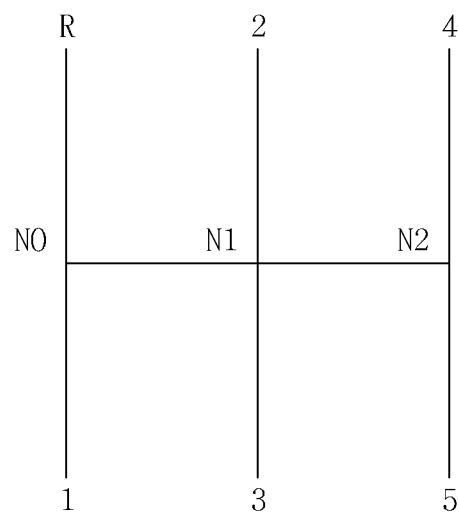
FIG. 3 is a diagram showing a shift pattern illustrating arrangement and operational path of shift stages implemented by an exemplary gear shift of the present invention.

Referring to FIGS. 1 to 3, an exemplary embodiment of the present invention includes a shift block 5 that is restricted in the rotational direction and movable in the straight direction on a control shaft 1 and has an integral shift finger 3 in order to implement selecting operation with straight motion and shifting operation with rotation, a driving actuator such as a driving motor 7, a shifting unit 9 that rotates control shaft 1 using power from the driving motor and changes rotational direction of the control shaft in accordance with rotational angles of the driving motor, and a selecting unit 11 sliding shift block 5 straight on control shaft 1 using the power from driving motor 7 in a section where shifting unit 9 is not driven by the power of driving motor 7.

Shifting unit 9 of the present embodiment includes, a first shift gear 13 fitted on a rotary shaft 7-1 of driving motor 7 and having teeth at a predetermined tooth portion, a second shift gear 15 fitted on the rotary shaft of the driving motor and having teeth at two predetermined tooth portions not corresponding to the predetermined tooth portion of the first shift gear, a second driven gear 17 fitted on the control shaft to engage with second shift gear 15, an idler gear 19 engaging with first shift gear 13, and a first driven gear 21 fitted on the control shaft to engage with idler gear 19.

Selecting unit 11 includes, a select driving gear 23 fitted on rotary shaft 7-1 of the driving motor and having a predetermined tooth portion having teeth, which does not correspond to the portions with teeth of shifting unit 9, a select driven gear 25 engaging with the select driving gear, a ball screw 27 coaxially fitted in the select driven gear in parallel with the rotary shaft of the driving gear, and a ball nut 29 screwed on the ball screw and sliding straight shift block 5 on the control shaft by reciprocating.

The two predetermined portions of second shift gear 15 are symmetrically positioned with the predetermined tooth portion of first shift gear 13 therebetween and the total length of the two predetermined portions of second shift gear 15 is the same as the length of the predetermined tooth portion of first shift gear 13.

In an exemplary embodiment of the present invention, a neutral portion 50 having no tooth may be formed in the predetermined tooth portion of first shift gear 13.

In another exemplary embodiment of the present invention, a neutral portion 60 having no tooth may be formed between the two predetermined portion having of second shift gear 15 and the predetermined tooth portion of the select driving gear 23.

This is for implementing a configuration in which shift finger 3 is rotated down to the neutral position by the teeth of first gear shift 13 as much as the upward shift stroke after it is shifted upward by teeth of second shift gear 15, and shift finger 3 is rotated again to the neutral position by other teeth of the second shift gear 15 after it is rotated downward for downward shift by other teeth of first shift gear 13.

For reference, the 'upward' and 'downward' herein are defined as when the shift lever of a manual transmission of the related art moves upward (forward) and when it moves downward (rearward) in its operation directions, respectively, as shown in FIG. 3.

Ball nut 29 has a locking protrusion 29-1 protruding toward the shift block to allow rotation on control shaft 1, but prevent reciprocation of shift block 5, and shift block 5 has a locking groove 5-1 to insert and rotate the locking protrusion.

An embodiment of the present invention is implemented to make shift along the pattern shown in FIG. 3 and the operation of the present invention is described hereafter for each shift stage and neutral position shown in FIG. 3.

Figure 4:
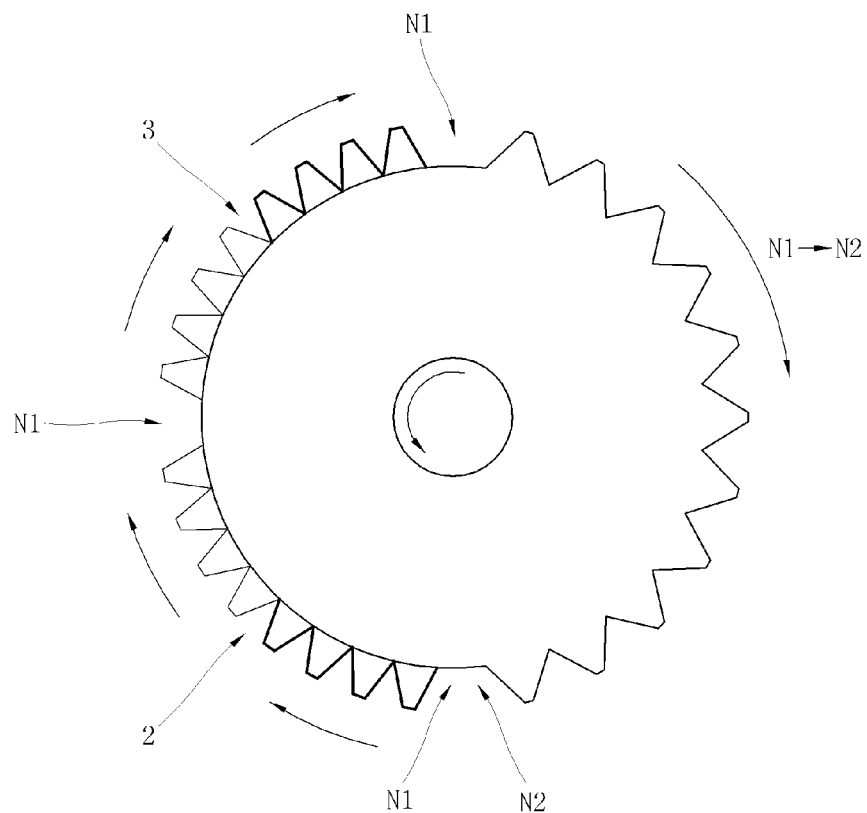
FIGS. 4 to 9 are views illustrating the operation of an exemplary gear shift of the present invention.
Figure 4:
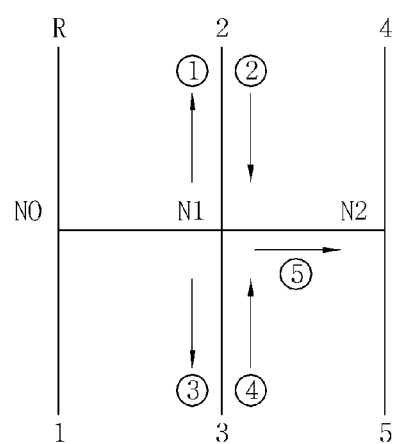

FIG. 4 illustrates when the shift lever is moved from the neutral position N1 to the second stage, and to the third stage through the N1, and returned to the N1, and then to N2.

For reference, for the convenience of the description, the two predetermined tooth portions of the second shift gear are divided into the one at the upper side of FIG. 4, which is the a second shift-upper portion 15-1, and the other one at the lower side, which is a second shift-lower portion 15-2.

The N1 position is where second shift-lower portion 15-2 of the second shift gear starts to engage with second driven gear 17, in which as driving motor 7 starts to rotate counterclockwise, as shown in FIG. 4, second shift-lower portion 15-2 engages with second driven gear 17 and rotates control shaft 1 clockwise.

As control shaft 1 is rotated clockwise, the shift block rotates and shift finger 3 moves upward for second stage shift.

As the driving motor continues rotating in the same direction, first shift gear 13 rotates the first driven gear through idler gear 19 and control shaft 1 rotates in the opposite direction, counterclockwise, such that shift finger 3 rotates downward to return to the neutral position N1.

As the driving motor continues rotating in the same direction after the shift finger reaches the N1, first driven gear 21 moves shift finger 3 to the third stage, further rotating, thereby making third state shift.

As the driving motor continues rotating counterclockwise, first shift gear 13 disengages from idler gear 19 and second shift-upper portion 15-1 of the second shift gear engages second driven gear 17, such that control shaft 1 rotates clockwise again by the rotation of the second driven gear and shift finger 3 rotates upward to the N1.

As driving motor 7 further rotates, second shift-upper portion 15-1 of the second shift gear disengages from second driven gear 17, such that select driving gear 23 engages with select driven gear 25 and the select driven gear and ball screw 27 start to rotate.

Accordingly, ball nut 29 moves shift block 5 to the right, moving right in the figure, thereby achieving the N2 status.

Figure 5:
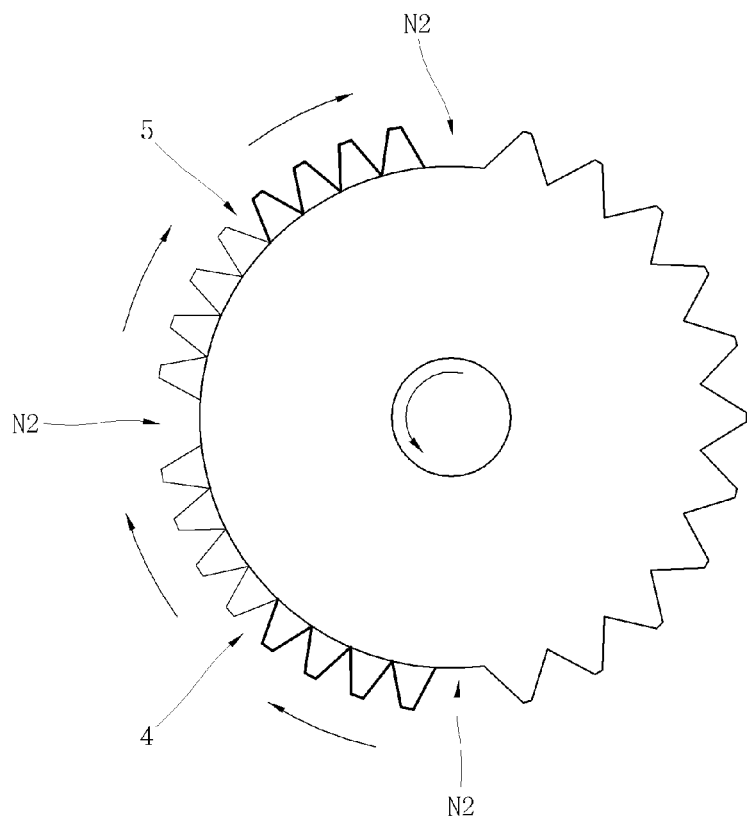
Figure 5:
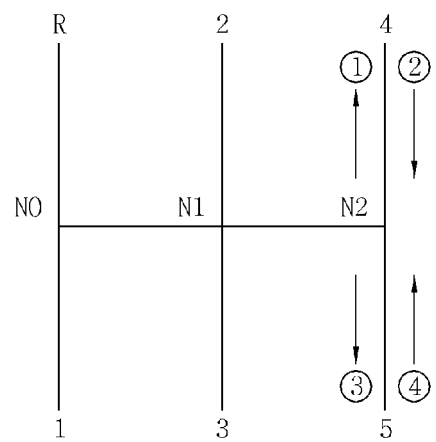

As driving motor 7 continues rotating counterclockwise even after the N2 status, as returning to N1 from the N1 status through the second and third stages, as shown in FIG. 5, second shift-lower portion 15-2 of the second shift gear rotates second driven gear 17 to make fourth stage shift. Thereafter first shift gear 13 rotates first driven gear 21 to the N2 and then make fifth stage shift, and then second shift-upper portion 15-1 rotates second driven gear 17, such that shift finger 3 returns to the N2.

Figure 6:
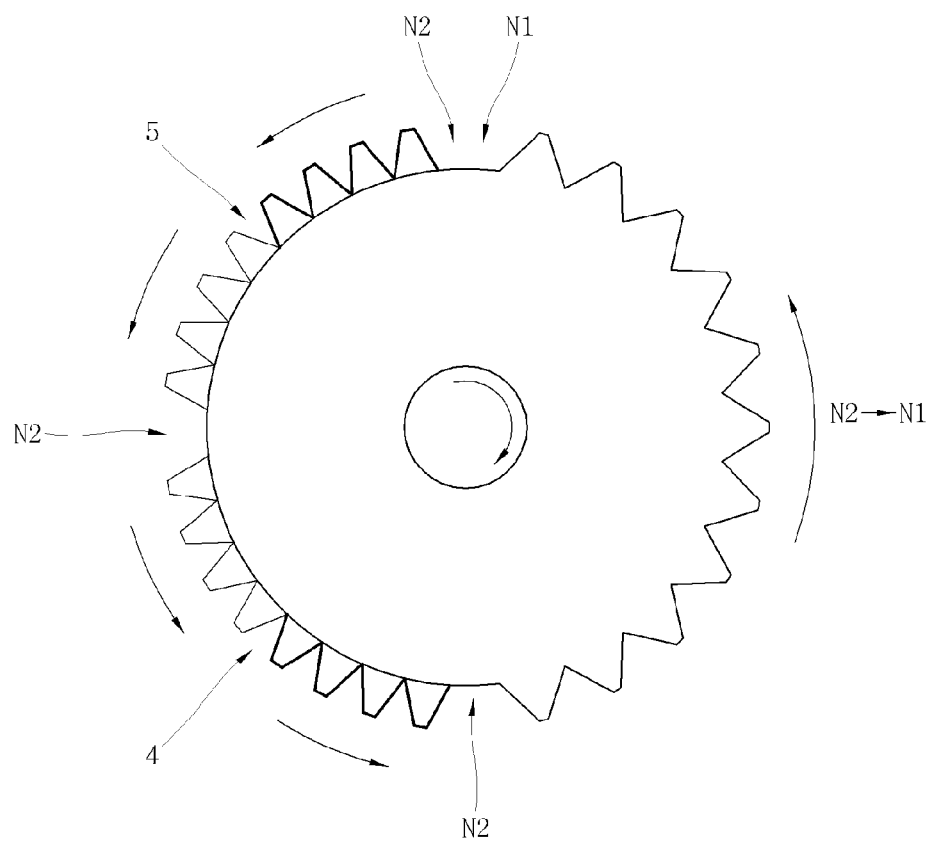
Figure 6:
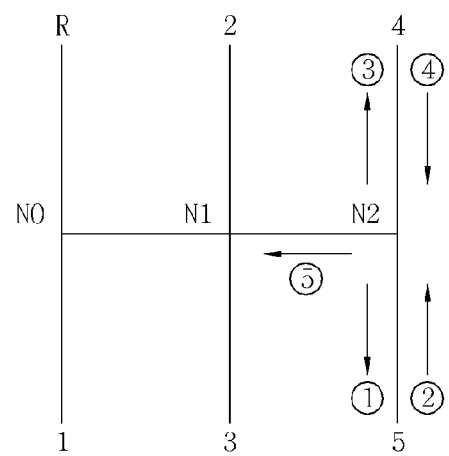

In the above status, as driving motor 7 rotates opposite to the above, clockwise, as shown in FIG. 6, second shift-upper portion 15-1 rotates second driven gear 17 counterclockwise, such that shift finger 3 rotates downward to make fifth stage shift. Further, first shift gear 13 further rotates first driven gear 21 clockwise, shift finger 3 rotates upward to the N2, and then driving motor 7 further rotates clockwise, it correspondingly moves to the fourth stage and then returns to the N2.

Thereafter, select driving gear 23 rotates select driven gear 25, such that ball nut 29 is moved left to the N1 in the figure.

Figure 7:
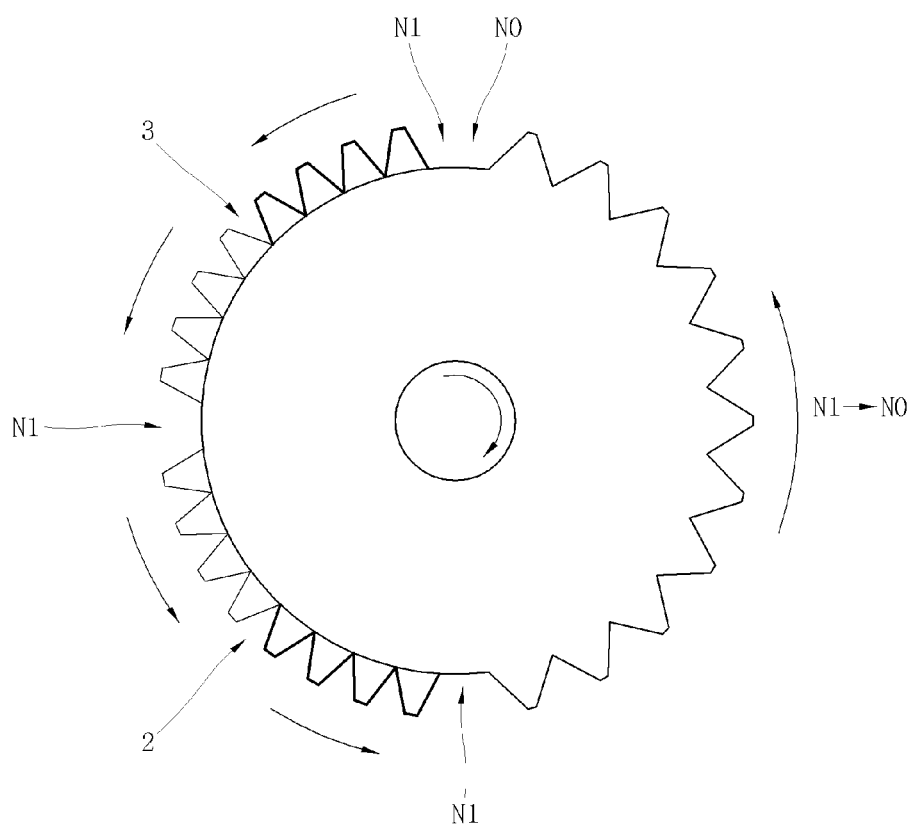
Figure 7:
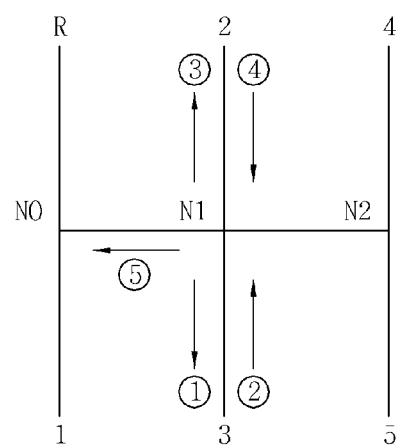

FIG. 7 illustrates when driving motor continues rotating clockwise from the N1 status, and this operation is exactly opposite to that shown in FIG. 4. Therefore, as the motor rotate, shift is sequentially made from the N1, third stage, N1, second stage, and N1. Thereafter, as select driving gear 23 rotates select driven gear 25, the ball nut further move left to the N0 status.

Figure 8:
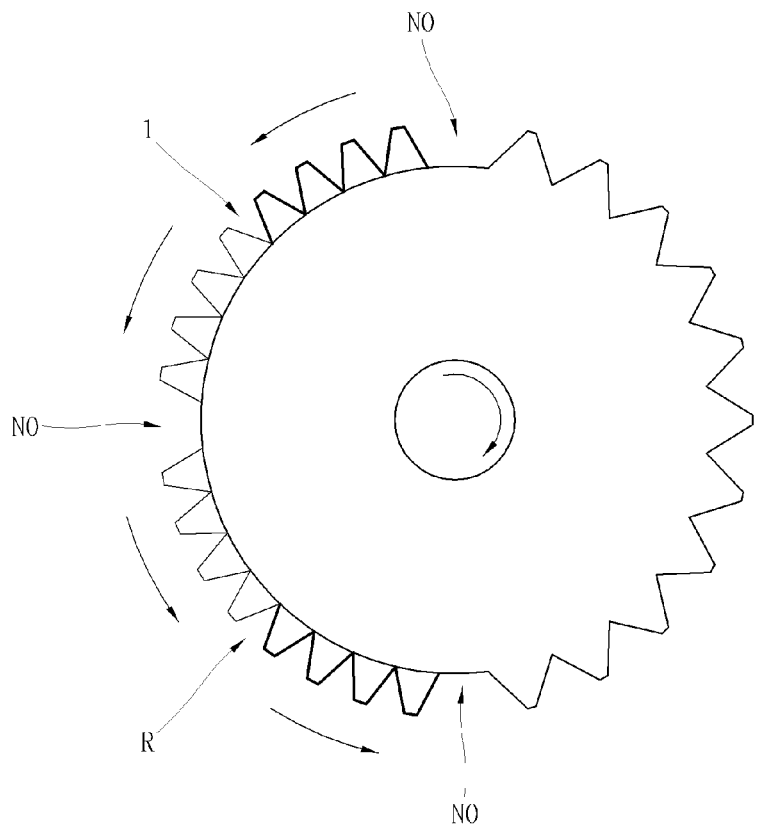
Figure 8:
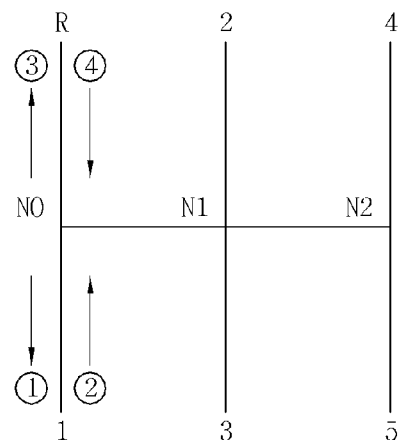

FIG. 8 illustrates when the driving motor further rotates clockwise from the No status, in which second shift-upper portion 15-1 drives second driven gear 17 to make first stage shift, first shift gear 13 drives first driven gear 21 to the N0 and then to the R stage, thereafter, as the second shift-lower portion 15-2 drives second driven gear 17, it returns to the N0.

Figure 9:
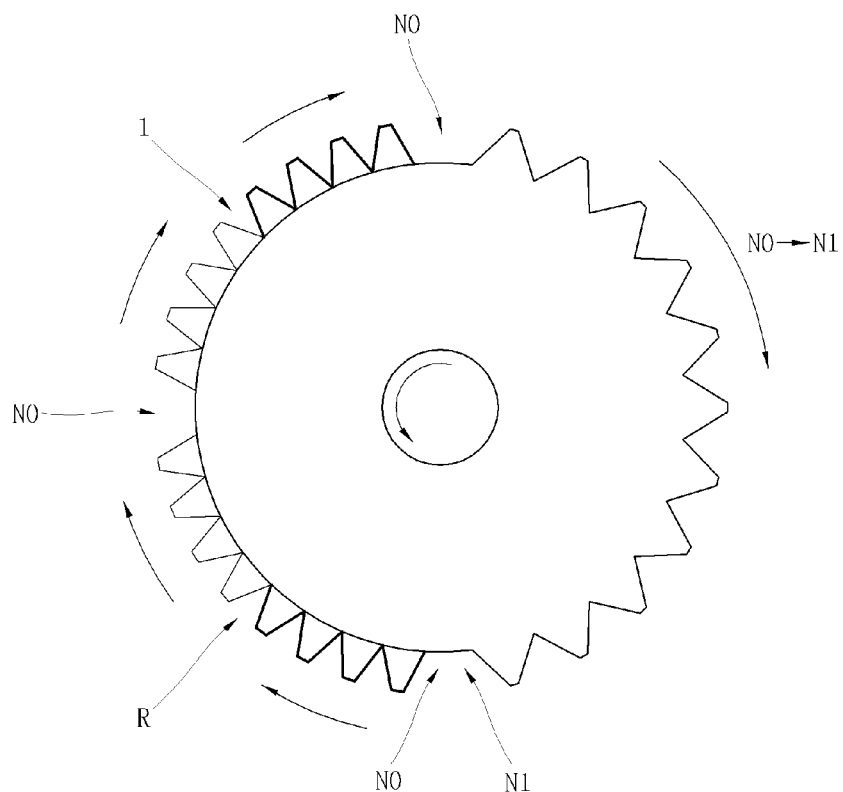
Figure 9:
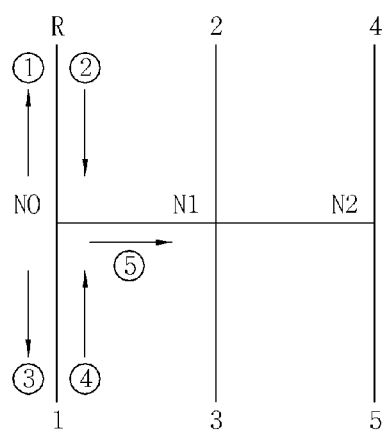

FIG. 9 illustrates an example of returning to the N1 status of FIG. 1 by rotating driving motor 7 counterclockwise from the above status.

That is, as the driving motor rotates counterclockwise from the N0 status, second shift-lower portion 15-2 drives second driven gear 17 to the R stage, first shift gear 13 drives first driven gear 21 to return to the N0 and then makes first stage shift. Thereafter, second shift-upper portion 15-1 drives second driven gear 17 to the N0, and select driving gear 23 rotates select driven gear 25 to return ball nut 29 to the N1 status.

Shift to all of the shift stages shown in FIG. 3 can be implemented by rotating one driving motor twice clockwise and the twice counterclockwise, as described above.

Although the shift order to each shift stage depends on the rotation of the driving motor, it is possible to achieve sufficient response while shifting the gear without awareness of a driver, by releasing the clutch during a series of operations from the second stage to the fourth stage, for example, when the driver wants to shift the gear from the second stage to the fourth stage.

As described above, in a gear shift unit for automated manual transmission according to an exemplary embodiment of the present invention, since only one motor is used as a power source for substantial shifting, it is possible to have an effect of reducing the number or parts and the weight, thereby decreasing the manufacturing cost, and it is also possible to easily mount the transmission in a vehicle.

For convenience in explanation and accurate definition in the appended claims, the terms "upper" and "lower" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A gear shift unit for an automated manual transmission, comprising:
    a shift block that is restricted in the rotational direction and slidably movable along a control shaft, and has a shift finger in order to implement a selecting operation with straight motion thereof and a shifting operation with rotation motion thereof;
    a driving actuator;
    a shifting unit selectively engaged with the driving actuator to rotate the control shaft by power of the driving actuator, wherein the shifting unit changes rotational direction of the control shaft in accordance with rotational angles of the driving actuator; and
    a selecting unit selectively engaged with the driving actuator to slide the shift block along the control shaft by power of the driving actuator while the shifting unit is not driven by the power of the driving actuator;
    wherein the shifting unit includes:
        a first shift gear fixed to a rotary shaft of the driving actuator and having a predetermined tooth portion;
        a second shift gear fixed to the rotary shaft of the driving actuator and having two predetermined tooth portions not corresponding to the predetermined tooth portion of the first shift gear;
        a second driven gear fixed to the control shaft and selectively engaging with one of the two predetermined tooth portions of the second shift gear;
        an idler gear selectively engaging with the predetermined tooth portion of the first shift gear; and
        a first driven gear fixed to the control shaft to engage with the idler gear; wherein the selecting unit includes:
        a select driving gear fixed to the rotary shaft of the driving actuator and having a predetermined tooth portion that does not correspond to the two predetermined tooth portions of the second shift gear and the predetermined tooth portion of the first shift gear;
        a select driven gear selectively engaging with the predetermined tooth portion of the select driving gear;
        a leading guide coaxially fixed to the select driven gear in parallel with the rotary shaft of the driving gear; and
        a shifting member movably coupled to the leading guide and selectively sliding the shift block along the control shaft in a reciprocating manner, wherein the shift block is slidably coupled to the control shaft.

2. The gear shift unit for the automated manual transmission as defined in claim 1, wherein the leading guide includes a ball screw and the shifting member includes a ball nut.

3. The gear shift unit for the automated manual transmission as defined in claim 1,
    wherein the predetermined tooth portion of the first shift gear is formed between the two predetermined tooth portions of the second shift gear, and wherein the two predetermined tooth portions of the second shift gear are symmetrically formed with respect to the predetermined tooth portion of the first shift gear.

4. The gear shift unit for the automated manual transmission as defined in claim 3, wherein the total length of the two predetermined tooth portions of the second shift gear is the same as the length of the predetermined tooth portion of first shift gear.

5. The gear shift unit for the automated manual transmission as defined in claim 3, wherein the predetermined tooth portion of the first shift gear includes a first neutral portion in which a tooth is not formed.

6. The gear shift unit for the automated manual transmission as defined in claim 3, wherein a second neutral portion in which a tooth is not formed, is formed between the two predetermined tooth portions of the second shift gear and the predetermined tooth portion of the select driving gear.

7. The gear shift unit for the automated manual transmission as defined in claim 1, wherein the shifting member has a locking protrusion protruding toward the shift block to allow rotation of the shift block on the control shaft, but prevent reciprocation of the shift block along the control shaft, and
the shift block has a locking groove to receive the locking protrusion therein.

\* \* \* \* \*